June 14, 1949.    O. D. H. BENTLEY    2,472,802
LUBRICATION SYSTEM
Filed June 4, 1947
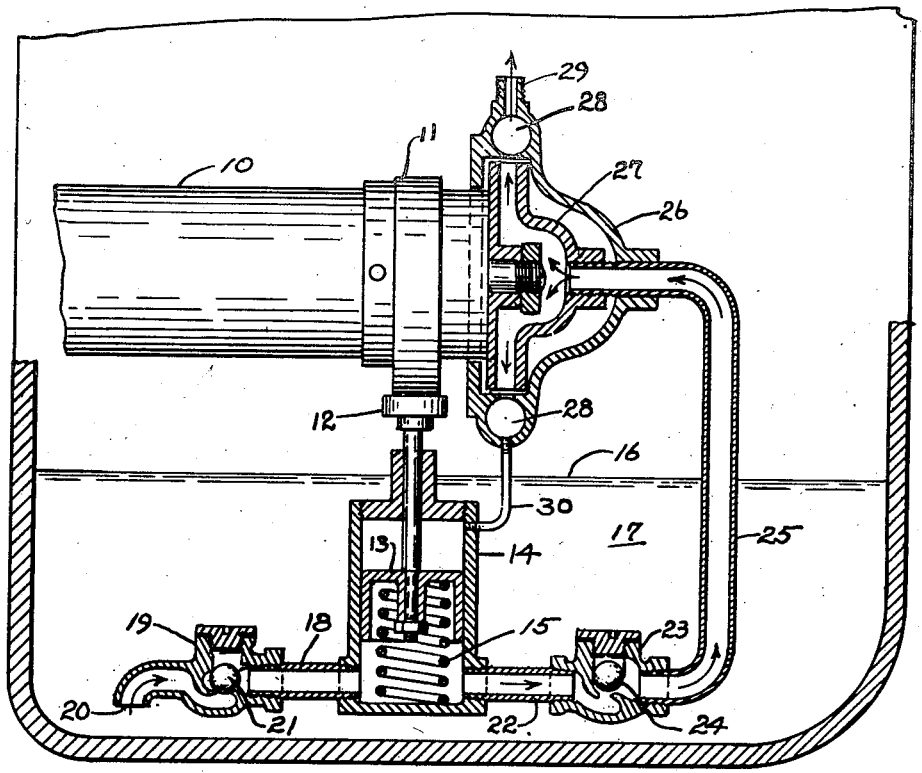
Fig. 1.
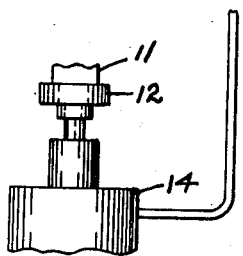
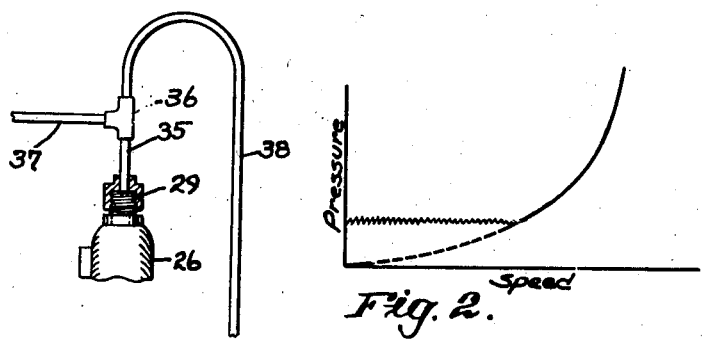
Fig. 2.
Fig. 3.
INVENTOR.
OLIVER D. H. BENTLEY
BY Robert J. Palmer
Attorney Patented June 14, 1949

2,472,802

UNITED STATES PATENT OFFICE 2,472,802

LUBRICATION SYSTEM

Oliver D. H. Bentley, Dover, Mass., assignor to Westinghouse Electric Corporation, East Pittsburgh, Pa., a corporation of Pennsylvania Application June 4, 1947, Serial No. 752,322

6 Claims. (Cl. 184—6)

This invention relates to lubrication systems, and has as an object, the adequate lubrication of machinery over a wide range of speeds, including idling as well as high speeds.

My Patent No. 2,071,913 discloses a lubrication system which included cooperating reciprocating and centrifugal pumps, the reciprocating pump being effective at low speeds only, and the centrifugal pump being effective at high speeds, the system being designed for a steam turbine having a vertical, pump driving shaft.

This invention provides a lubrication system generally similar as far as function is involved, to that of my patent, but more suitable for machines, such as steam turbines, having horizontal shafts. The rotor of the centrifugal pump is mounted on the horizontal shaft above the oil level in the oil sump of the turbine, and the reciprocating pump is used to prime the centrifugal pump, as well as to provide the oil pressure for lubrication at low shaft speeds.

The invention will now be described with reference to the drawing, of which:

Fig. 1 is a side elevation, in section, of a lubrication system embodying this invention, for lubricating the bearings of a horizontal shaft;

Fig. 2 is a chart illustrating the speed-pressure characteristics of the two pumps of the system, and Fig. 3 is a fractional view illustrating another oil circuit which may be used.

The horizontal shaft 10 which may be that of a steam turbine which is not illustrated, has the cam 11 formed thereon, and which is contacted by the upper end of the plunger 12, to the lower end of which, the piston 13 of the reciprocating pump 14, is attached. Movement of the piston 13 is opposed by the spring 15 extending between same and the lower wall 16 of the pump 14.

The pump 14 is arranged below the oil level 16 in the oil sump 17, and has an inlet tube 18 connected to the outlet of the check valve 19 which has an oil inlet 20. The ball 21 of the valve rises during the up or suction stroke of the piston 13, and is unseated whereby oil can pass through the valve into the pump 14. Upon the beginning of the down or pressure stroke of the piston 13, the ball 21 is seated, thereby closing the valve 19.

The outlet tube 22 of the pump 14 is connected to the inlet of the check valve 23 which has a ball 24 which is unseated during the pressure strokes of the piston 13, but is seated during its suction strokes, whereby the valve 23 passes oil only during the pressure strokes of the piston.

The outlet of the valve 23 is connected by the tube 25 to the axial inlet of the centrifugal pump 26, which has a rotor 27 mounted on the end of the shaft 10 for rotation therewith.

The outlet passage 28 of the pump 26 has the oil outlet 29 which is adapted to be connected by tubing to the bearings to be lubricated. The passage 28 is also connected by the small tube 30 with the interior of the pump 14 above the head of the piston 13, so as to supply oil from the pump 26 which opposes the up movement of the piston 13 as will be described.

In operation, as the shaft 10 starts to rotate, the piston 13 of the reciprocating pump 14, is moved downwardly in a pressure stroke on each revolution of the shaft, by the contact of the plunger 12 with the cam 11. The spring 15 returns the piston 13 on its up or suction stroke as the cam recedes. On the suction stroke the piston 13 draws oil from the sump 17 through the check valve 19, the check valve 23 being closed at this time. On the pressure stroke of the piston, the check valve 19 is closed preventing the return of the oil into the sump, and the check valve 23 opens permitting the passage of the oil drawn into the pump 14 on the suction stroke of its piston, through the tube 25 into the centrifugal pump 26.

The pump 26 is ineffective in itself, at low speeds, to supply sufficient oil pressure for lubricating the bearings. The reciprocating pump 14 is effective at low speeds, and at such speeds supplies oil through the centrifugal pump for lubricating the bearings.

At the low speeds, a low oil pressure is exerted through the tube 30 against the head of the piston 13, tending to force the piston plunger 12 away from the cam 11, but the diameter of the interior of the tube 30 is so dimensioned that the oil pressure through it at low speeds is insufficient to displace the plunger.

At high speeds, the centrifugal pump 26 having been primed by the reciprocating pump 14, operates to supply sufficient oil pressure through the tube 30 to force the plunger 12 away from contact with the cam 11 thereby placing the pump 14 out of action. Then the pump 26 draws oil through the inlet 20 and the valves 19 and 23, and forces the oil through the outlet 29 under sufficient pressure to adequately lubricate the bearings.

Referring now to Fig. 2, the horizontal, wavy line represents the constant pressure provided by the reciprocating pump, which pressure may be three pounds. The reciprocating pump may operate up to say, 800 revolutions per minute of the shaft 10. The curved, dashed line indicates the pressures the centrifugal pump would provide for shaft speeds up to 800 revolutions per minute, and the solid, curved line indicates the pressures the centrifugal pump would provide for shaft speeds above 800 revolutions per minute. Thus, in the embodiment illustrated, the centrifugal pump could act to render the reciprocating pump inoperative when the driving shaft reaches a speed of 800 revolutions per minute.

In the oil circuit of Fig. 3, the outlet 29 of the centrifugal pump 26 is connected by the tube 35 to the T-connection 36 which supplies oil through the tube 37 to the bearings to be lubricated, and through the tube 38 to the interior of the reciprocating pump 26 above the piston thereof. When the centrifugal pump is up to speed the oil through the tube 38 holds the plunger 12 of the pump 26 away from the cam 11.

While one embodiment of the invention has been described for the purpose of illustration, it should be understood that the invention is not limited to the exact disclosure, as modifications thereof may be suggested by those skilled in the art without departure from the essence of the invention.

What is claimed is:

1. A lubrication system for a machine having an oil sump and a rotary shaft, comprising a centrifugal pump having a rotor attached to the shaft for rotation therewith, a reciprocating pump having a piston, means operated by said shaft for moving said piston on its pressure strokes, a spring for returning said piston on its suction strokes, means for supplying oil from said sump into said reciprocating pump and from same into said centrifugal pump, and means using oil from said centrifugal pump for rendering said means operated by the shaft ineffective to move said piston when said shaft rotates at high speeds.

2. A lubrication system for a machine having an oil sump and a rotary shaft, comprising a centrifugal pump having a rotor attached to the shaft for rotation therewith, a reciprocating pump having a piston, a cam on said shaft, a plunger contacting said cam and attached to said piston for moving the piston on its pressure strokes upon rotation of said shaft, a spring returning said piston on its suction strokes, means for supplying oil from said sump into said reciprocating pump and from same into said centrifugal pump, and means for supplying oil from said centrifugal pump against said piston for moving said plunger from contact with said cam when said shaft rotates at high speeds.

3. A lubrication system as claimed in claim 1 in which a check valve is arranged between the sump and the reciprocating pump and which opens on the suction strokes and closes on the pressure strokes of the reciprocating pump, and another check valve is arranged between the reciprocating pump and the centrifugal pump and which opens on the pressure strokes of the reciprocating pump and closes on its suction strokes.

4. A lubrication system as claimed in claim 2 in which a check valve is arranged between the sump and the reciprocating pump and which opens on the suction strokes and closes on the pressure strokes of the reciprocating pump, and another check valve is arranged between the reciprocating pump and the centrifugal pump and which opens on the pressure strokes of the reciprocating pump and closes on its suction strokes.

5. A lubrication system for a machine having an oil sump and having a substantially horizontal, rotary shaft above the oil level in the sump, a centrifugal pump having its rotor attached to the shaft for rotation therewith, a reciprocating pump having a piston, in said sump, a cam on said shaft, a substantially vertically movable rod contacting said cam and connected to said piston for moving same on its pressure strokes upon rotation of said shaft, a spring for returning said piston on its suction strokes, means for supplying oil from said sump into said reciprocating pump and from same into said centrifugal pump, and means for supplying oil from said centrifugal pump against said piston for moving said rod from contact with said cam when said shaft rotates at high speeds.

6. A lubrication system as claimed in claim 5 in which a check valve is arranged between the sump and the reciprocating pump and which opens on the suction strokes and closes on the pressure strokes of the reciprocating pump, and another check valve is arranged between the reciprocating pump and the centrifugal pump and which opens on the pressure strokes of the reciprocating pump and closes on its suction strokes.

OLIVER D. H. BENTLEY.

No references cited.